United States Patent
Yordy

(10) Patent No.: US 7,410,406 B2
(45) Date of Patent: Aug. 12, 2008

(54) VIRGIN QUEEN BEE REARING AND INTRODUCTION SYSTEM

(76) Inventor: Franz Yordy, 34769 E. Lacomb Rd., Lebanon, OR (US) 97355

( * ) Notice: Subject to any disclaimer, the term of this patent is extended or adjusted under 35 U.S.C. 154(b) by 312 days.

(21) Appl. No.: 11/401,775

(22) Filed: Apr. 11, 2006

(65) Prior Publication Data
US 2007/0238391 A1    Oct. 11, 2007

(51) Int. Cl.
*A01K 49/00*    (2006.01)
(52) U.S. Cl. .................................. 449/2; 449/8; 449/28
(58) Field of Classification Search ................ 449/2, 449/7, 8, 10, 21, 28
See application file for complete search history.

(56) References Cited

U.S. PATENT DOCUMENTS

| | | | | |
|---|---|---|---|---|
| 1,361,404 A | * | 12/1920 | Pritchard | 449/28 |
| 1,397,830 A | * | 11/1921 | Yates | 449/8 |
| 1,479,751 A | * | 1/1924 | Smith et al. | 449/28 |
| 1,518,102 A | | 12/1924 | Philpott | |
| 1,613,752 A | * | 1/1927 | Hinds | 449/28 |
| 1,652,539 A | | 12/1927 | Marks | |
| 2,403,840 A | | 7/1946 | Ashurst | |
| 3,074,081 A | * | 1/1963 | Stallings | 449/28 |
| 4,718,134 A | * | 1/1988 | Ashby | 449/28 |
| 5,135,429 A | | 8/1992 | Gefen et al. | |

FOREIGN PATENT DOCUMENTS

DE    32 29 181 A1  *  2/1984

* cited by examiner

*Primary Examiner*—Rob Swiatek
(74) *Attorney, Agent, or Firm*—Teri G. Andrews

(57) ABSTRACT

A queen bee rearing and introduction system which has a base portion that includes a queen bee emerging hole disposed therein and an adjacent cell cup insertion hole disposed on a first side. On an opposite, second side there is a frame retention tab for attaching the queen bee rearing system into a standard wood hive box frame disposed along its length. The base portion also has at least one cage latch. There is a cage portion that has one open end and one enclosed end. The open end has at least one cage latch aperture. When a queen cell cup containing a queen bee cell is inserted into the cell insertion hole of the base portion, the open end of the cage portion is slid over the queen cell cup and firmly snapped into place around the base portion by sliding the cage latch of the base portion into the cage latch aperture of the cage portion.

14 Claims, 2 Drawing Sheets

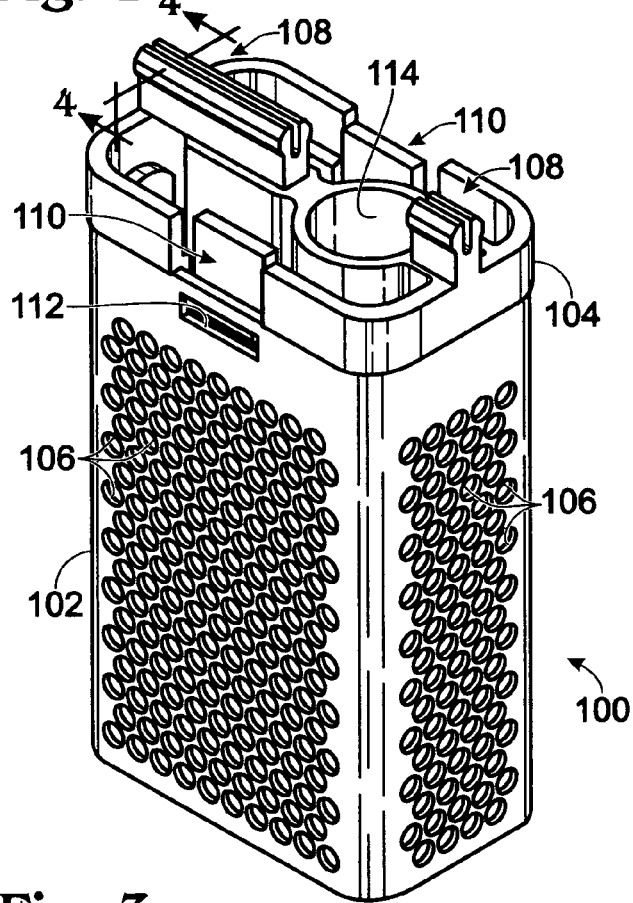
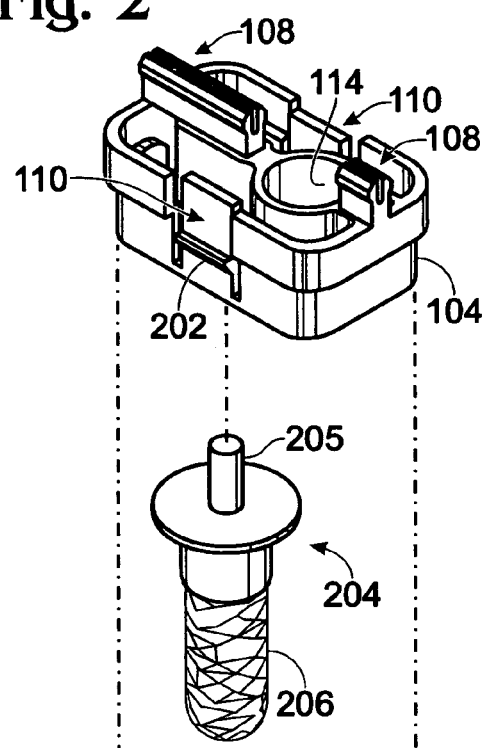
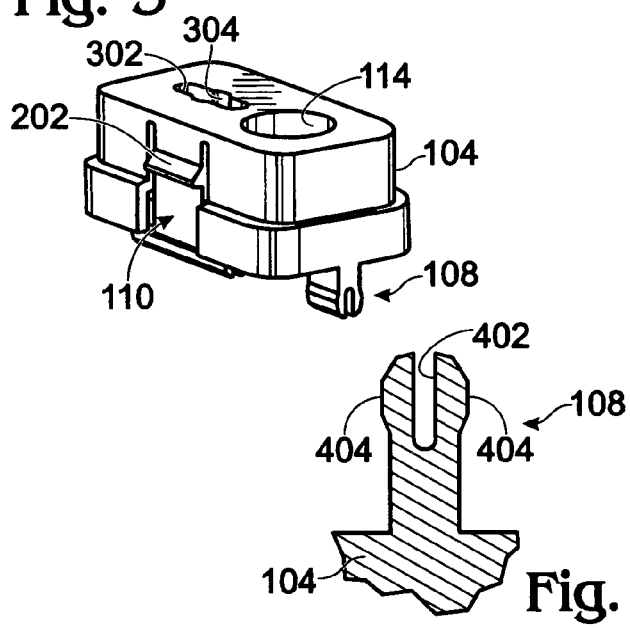
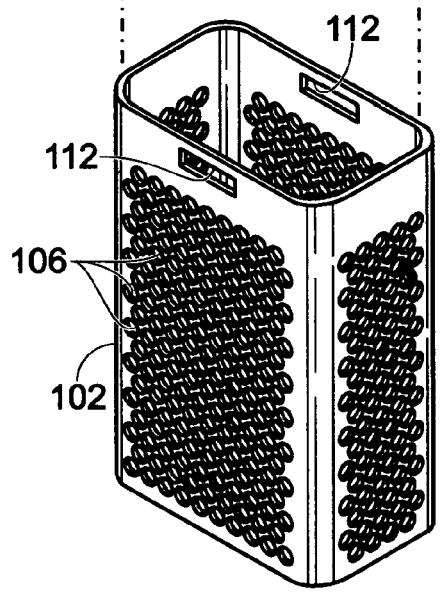

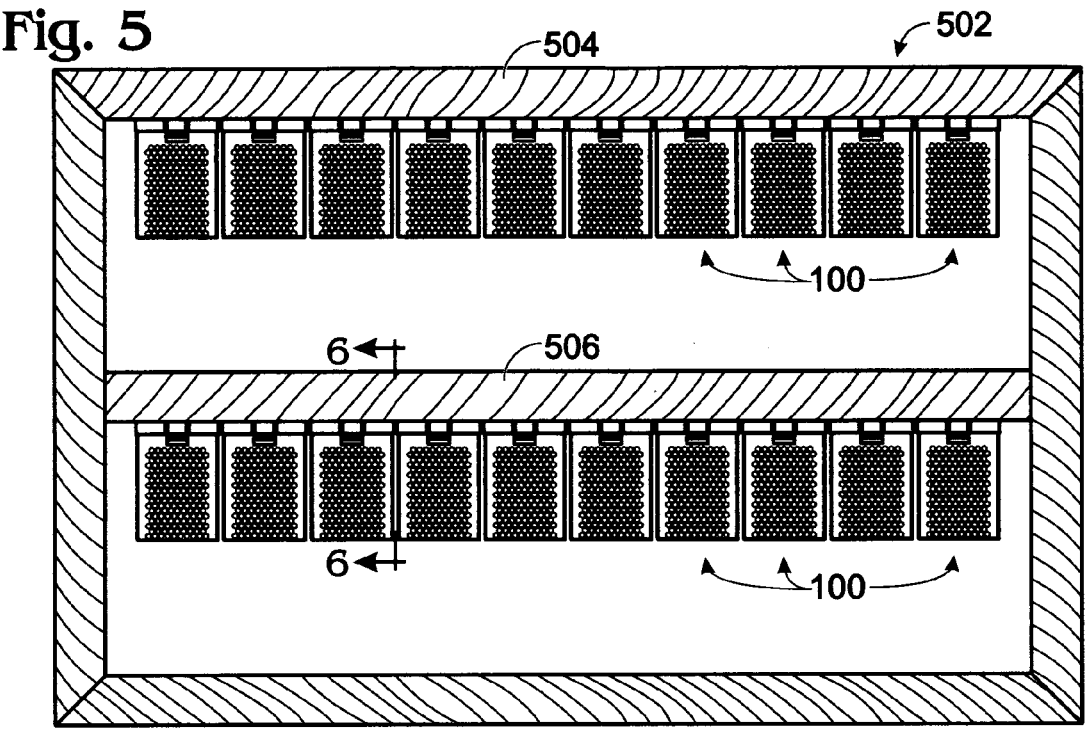
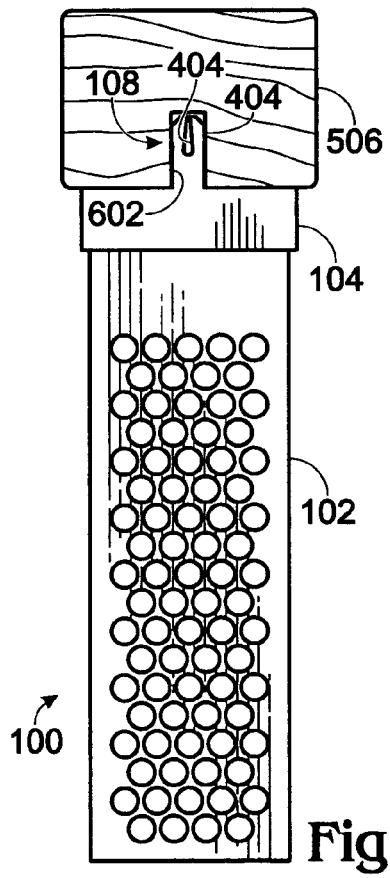
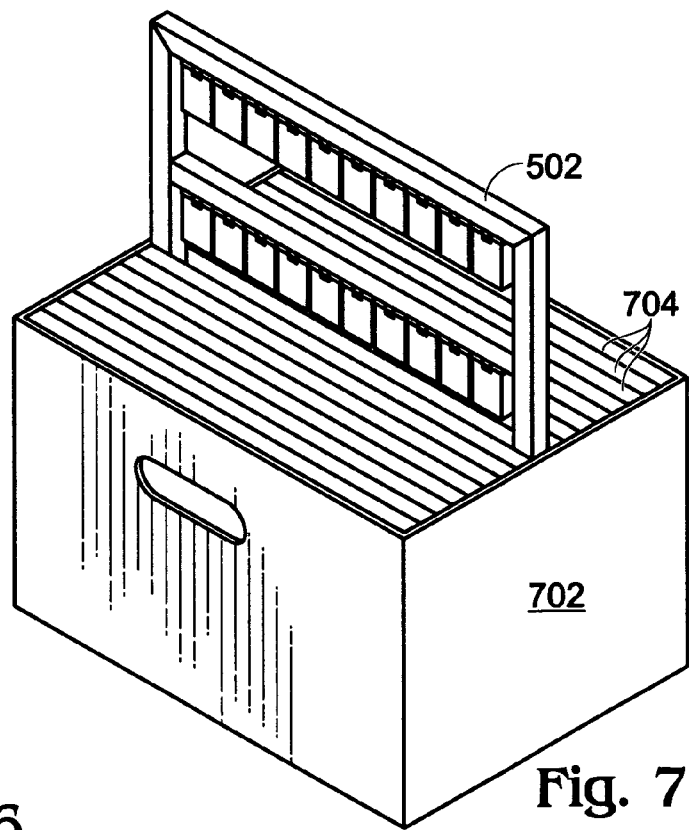

VIRGIN QUEEN BEE REARING AND INTRODUCTION SYSTEM

FIELD OF THE INVENTION

This invention relates to beekeeping and particularly to rearing and introducing virgin queen bees into hives.

BACKGROUND OF THE INVENTION

Queen bee rearing is a nearly century old practice; it is also an art which requires patience, skill and a steady hand. Queen bees (hereinafter referred to as "Queens") vary greatly in size and weight; the greater the weight the more ovarioles a queen has and the more eggs she will lay. The size of the queen is a direct result of how well she is fed and cared for during her growth and development, especially during the larval stage. Better queens are produced when nectar and pollen are available in greater quantity. Larger, quality queens produce more offspring than poor ones. One wants the maximum number of bees in a hive during the honey flow; this means maximum brood production. A standard, healthy colony of bees requires a constant emergence of brood from a laying queen to maintain balance and strength.

A typical method of rearing queens is by the grafting technique which entails the transfer of young larvae from a brood comb to queen cells. It is very important that there be an abundance of pollen- and nectar-producing plants during the time the queens are raised. This may require that queen rearing be restricted to a particular time of the year. However, some queen raisers have been able to grow queens all year using pollen and nectar substitutes.

There are many steps involved in the typical process of commercial queen rearing. As previously mentioned, the larvae is scooped out of the brood comb along with its existing royal jelly and carefully placed into a queen cell cup. Using a standard slotted wooden frame that is typically used for honey production, the filled queen cell cups are hung opening down in the slot of the frame.

The filled frames are slid into a cell draw colony where young worker bees feed the larvae to the point where the larvae are sealed off in the cell. These frames are banked and put into an incubator. During this time, the queens are "pupating" or turning from larvae to insect.

It takes approximately seventeen days for a queen to emerge from her formed cell. Before she emerges, the queen cell is put into a mating nucleus colony, or "nuke", where she emerges as the only queen. Small nucleus colonies (about a handful of bees) result in a higher percentage of accepted queen cells and mated queens. Smaller groups of bees are likely to accept any queen. However, even with a weak nuke colony approximately 20% of queens do not live. When queen cells are introduced into strong colonies, as many as 50% of the queens are destroyed by the other bees that are not familiar enough with her.

A significant problem associated with beekeeping can be pests. A weak colony can be easily overtaken or killed by pests where a stronger, larger colony can be far more resistant. A good pest example is the African Small Hive Beetle that has recently been found in the United States. This beetle has wrecked havoc with the standard grafting method of beekeeping as they ravage and destroy weak colonies. The only colonies able to resist the beetles and keep them in check are strong colonies. However, the survival rate of queens in strong colonies is fairly low. When the queen dies, the remainder of the colony will die as well and there is both a loss of bees as well as a significant mess to clean up before a new colony can be placed in the hive. It is important to have the ability to introduce queens into stronger colonies that are able to survive pests such as the African Small Hive Beetle yet it is also necessary to have queens that can survive the introduction.

One solution is to protect the queen during emergence into a strong colony. Queen cell protectors by Ezi-Queen Systems are hair-roller shaped cages used to cover the queen cells so emerging queens are confined until the bees in the colony have accepted her. Unfortunately there are several problems with these cages. When the queens are placed in the colony in the cage, there is no means of keeping the cage oriented in a way that the queen remains upside down. If the queen does not maintain this upside down orientation, she can be deformed or damaged at emergence or often not survive at all. Another problem with the Ezi hair roller cage is that the cell cup is attached to the cage opposite the emergence hole. If oriented correctly with the queen upside down, debris from the queen's cap can fall into the emergence hole during the queen's emergence not allowing the queen to emerge and she will die. Additionally, the Ezi-roller cage does not have room enough for the queen to move around as it is a narrow tube—the queen can only move forward and backward. This can lead to deformed, weak or non-surviving queens. And finally, the Ezi-roller cage is not suited for high production queen rearing, but meant for the low production, hobbiest.

It is an object of the present invention to provide a virgin queen bee rearing and emerging device and system that will produce healthy queen bees with a near 100% efficiency rate.

It is an another object of the present invention to provide a queen bee rearing and emerging device and system that will allow introduction of virgin queen bees into strong colonies with minimal or no danger to the newly emerged queen.

It is yet a further object of the present invention to provide a device and system that allows the use of standard beekeeping supplies for correct queen orientation during rearing and emergence.

SUMMARY OF THE INVENTION

The present invention is a queen bee rearing and introduction system which has a base portion that includes a queen bee emerging hole disposed therein and an adjacent cell cup insertion hole disposed on a first side. On an opposite, second side there is a frame retention tab for attaching the queen bee rearing system into a standard wood hive box frame disposed along its length. The base portion also has at least one cage latch. There is a cage portion that has one open end and one enclosed end. The open end has at least one cage latch aperture. When a queen cell cup containing a queen bee cell is inserted into the cell insertion hole of the base portion, the open end of the cage portion is slid over the queen cell cup and firmly snapped into place around the base portion by sliding the cage latch of the base portion into the cage latch aperture of the cage portion.

The system of the present invention houses and protects the emerging queen bee until she can be properly introduced into a mating cell or hive of bees. The system also facilitates mass production of queen bees with substantial improvement in efficiency over the previously used methods.

BRIEF DESCRIPTION OF THE DRAWINGS

FIG. 1 is a prospective view of the Virgin Queen Bee Rearing and Introduction System of the present invention.

FIG. 2 is an exploded view of the Virgin Queen Bee Rearing and Introduction System of the present invention.

FIG. 3 is a detailed view of the Base portion of the preferred embodiment of the present invention.

FIG. 4 is a detailed view of the Frame Saver Retention Tabs of the preferred embodiment of the present invention.

FIG. 5 is a prospective view of a standard wooden frame used in honey production loaded with the Virgin Queen Bee Rearing and Introduction Systems of the present invention.

FIG. 6 is a cross-sectional view taken at line 6-6 of FIG. 5 depicting the affixing of the Virgin Queen Bee Rearing and Introduction System of the present invention into a standard wood frame used in honey production.

FIG. 7 is a prospective view of the standard wood frame of FIG. 5 sliding into a standard bee hive box.

DRAWINGS

Reference Numerals

100 Virgin Queen Bee Rearing and Introduction System
102 V-Y Cage
104 V-Y Base
106 V-Y Cage Holes
108 Frame Saver Retention Tabs
110 Cage Release Tabs
112 Cage Retention Latch Aperture
114 Queen Bee Emergence Hole
202 Retention Latch
204 Cell Cup
205 Cell Cup Stem
206 Queen Bee Cell
302 Cell Cup Stem Slot
304 Cell Cup Stem Slot Dimple
402 Retention Tab Relief Slot
404 Retention Tab Protruding Side
502 Frame with VY Intro Cages
504 Standard Wood Frame
506 Cross Frame Bar
702 Standard Hive
704 Honey Producing Frames The above description and other objects, advantages, and features of the present invention will be more fully understood and appreciated by reference to the specification and accompanying drawings, wherein:

DETAILED DISCUSSION OF THE PREFERRED EMBODIMENTS

Referring to the figures, like elements retain their indicators throughout the several views.

FIG. 1 is a prospective view of the two-part Vera-Yordy Virgin Queen Bee Rearing and Introduction System 100 (hereinafter "V-Y System 100") of the present invention. V-Y System 100 has a Vera-Yordy Cage 102 (hereinafter "V-Y Cage 102") that snaps onto V-Y Base 104 by depressing Cage Release Tabs 110 on either side of V-Y Base 104 thereby allowing Retention Latches 202 (not shown) to slide into Cage Retention Latch Aperture 112. V-Y Cage 102 is perforated with Cage Holes 106 such that the queen bee can dispense her scent to familiarize the colony with her so she will be accepted when she is released.

Since it is desired that the V-Y System 100 be light weight, in the preferred embodiment it is constructed from plastic—either molded or machined. It has also been contemplated to construct it from a light weight metal such as aluminum or titanium. Even lightweight wood, such as balsa wood, would be a possible material from which to construct a V-Y System 100.

When the queen bee is placed into the nucleus colony, or "nuke", Emergence Hole 114 is filled with either a miniature marshmallow or a piece of candy. The candy or marshmallow prevents the queen from emerging before the colony has accepted her. By the time the candy or marshmallow has been consumed by the queen and the colony bees, the colony has been introduced to the queen bee's scent and has accepted her as their queen. It is also possible to place a cork, plug, or a piece of tape across Emergence Hole 114 and manually release the queen at a certain time—typically approximately 24 hours from the initial placement of V-Y System 100 into the nuke or mating colony.

Frame Saver Retention Tabs 108 are also shown in FIG. 1 and will be shown and discussed in more detail with FIG. 4.

FIG. 2 is an exploded view of V-Y System 100. In the previously mentioned grafting process, queen bee larvae are placed into Cell Cups 204 along with the surrounding royal jelly. With Queen Cell 206 fully developed, Cell Cup Stem 205 of Cell Cup 204 is easily snapped into Stem Slot Dimple 304 (not shown) in V-Y Base 104. V-Y Cage 102 is snapped onto V-Y Base 104 covering and protecting the queen within Queen Cell 206 until she emerges.

What makes the V-Y System 100 different from the present hair roller cage is that ten V-Y Systems 100 can be racked side-by-side into the grooved top bar of a standard hive Frame 504 (not shown) by inserting Frame Saver Retention Tabs 108 of V-Y Base 104 into the Frame 504's groove (not shown). Now Frame 504 can be loaded with many V-Y System 100 units with the queen in Queen Cell 206 in the optimum up-side-down orientation and placed into an incubator until placed in the stronger mating colony. In the mating colony, the V-Y System 100 can be inserted between the top bars of the frames in much the same way that a mini queen cage is inserted into a colony. The virgin queen can then be released from the cage by removing a cork or tape from the release hole, or by waiting for the bees to eat away a marshmallow or piece of candy that has been placed in the hole. Virgin queens may also be allowed to emerge from the queen cells while in the incubator and then only viable queens placed in the mating colonies. Either of these introduction methods will result in a higher percentage of mated queens than what is now being realized under current techniques.

FIG. 3 is a detailed bottom view of V-Y Base 104 of the preferred embodiment of the present invention. Adjacent to Emergence Hole 114 is Stem Slot 302 that has Stem Slot Dimple 304 in the center for insertion and alignment of Cell Cup Stem 205. With Emergence Hole 114 beside rather than opposite Cell Cup 204 (as previously discussed with the Ezi hair roller cage) there is no danger of filling the queen's Emergence Hole 114 with debris from Queen Cell 206 hampering or disallowing the queen's emergence.

FIG. 4 is a detailed view of the Frame Saver Retention Tabs 108 shown at cross-section 4-4 of FIG. 1 of the preferred embodiment of the present invention. Frame Saver Retention Tab 108 has Retention Tab Relief Slot 402 that closes slightly allowing Frame Saver Retention Tab 108 to be pressed into the slot of Standard Wood Frame 504 (not shown) without damaging the insertion slot. Retention Tab Protruding Side 404 provides enough tension within the slot to keep the V-Y System 100 firmly in place.

FIG. 5 is a prospective view of Standard Wooden Hive Frame Assembly 502, typically used in honey production, loaded with the V-Y Systems 100 of the present invention. Along with the standard slotted Frame 504, in the preferred embodiment there is a Cross Frame Bar 506 that holds an additional ten V-Y Systems 100 for a total of twenty queens to be produced on one Hive Frame Assembly 502. By using multiples of ten and twenty, this provides an easy way of keeping track of numbers of queens for mass production.

FIG. 6 is a cross-sectional view taken at line 6-6 of FIG. 5 depicting the affixing of the V-Y System 100 of the present invention into Cross Frame Bar 506. Frame Saver Retention Tab 108 of V-Y Base 104 is shown inserted into Frame Slot 602 by slightly collapsing Retention Tab Relief Slot 402 thereby firmly lodging Retention Tab Protruding Sides 404 into Frame Slot 602. By making Frame Saver Retention Tab 108 collapsible, minimal damage is done to Frame Slot 602 when V-Y Systems 100 are inserted so that it is reusable for a long period of time.

FIG. 7 is a prospective view of Standard Wood Frame 502 loaded with V-Y Systems 100 as shown and discussed in FIG. 5 above sliding into a Standard Bee Hive Box 702 along with other Frames 704 already installed.

Wherein the terms and expressions which have been employed in the foregoing specification are used therein as terms of description and not of limitation, there is no intention, in the use of such terms and expressions, of excluding equivalents of the features shown and described or portions thereof, it being recognized that the scope of the invention is defined and limited only by the claims which follow.

I claim:

1. A virgin queen bee rearing device, comprising:
    a base portion having a queen emerging hole disposed therein, an adjacent cell cup insertion hole disposed on a first side, at least one frame retention tab for attaching the queen bee rearing device into a top bar of a standard wood hive box frame disposed the length of a second side opposite the first side, and at least one cage latch; and
    a cage portion having an open end, an enclosed end, the open end having at least one cage latch aperture;
    wherein a queen cell cup containing a queen bee cell is inserted into the cell insertion hole, the open end of the cage portion is slid over the queen cell cup and firmly snapped into place around the base portion by sliding the cage latch into the cage latch aperture.

2. The virgin queen bee rearing device of claim 1, wherein the cage portion has a plurality of apertures disposed there through.

3. The virgin queen bee rearing device of claim 1, wherein the cage portion has a plurality of slotted apertures disposed there through.

4. The virgin queen bee rearing device of claim 1, wherein the at least one frame retention tab further comprises a relief slot disposed along the length of the tab for collapsing and aiding adhesion within a slot in the top bar of the standard wood hive box frame.

5. The virgin queen bee rearing device of claim 1, wherein the device is of a size that allows approximately ten devices to be installed adjacently along the top bar of the standard wood hive box frame and the frame with the devices installed slides into a standard slot in a standard hive box thereby containing the devices within the standard hive box, and the queen cells are oriented downward.

6. The queen bee rearing device of claim 5, further comprising a second frame bar parallel to the top bar holding an additional approximately ten queen bee rearing devices on the standard wood hive box frame.

7. The virgin queen bee rearing device of claim 1, wherein the device is constructed from molded plastic.

8. The virgin queen bee rearing device of claim 1, wherein the device is constructed from plastic.

9. The virgin queen bee rearing device of claim 1, wherein the device is constructed from aluminum.

10. The virgin queen bee rearing device of claim 1, wherein the device is constructed from wood.

11. A method of rearing virgin queen bees, comprising the steps of:
    scooping larvae and a surrounding supply of royal jelly into a queen cell cup having a cell stem;
    hanging a plurality of the filled queen cell cups opening down from a slotted frame;
    inserting the slotted frame filled with queen cell cups into a cell draw colony wherein young worker bees feed the larvae to a point where the larvae is sealed off creating a queen cell;
    inserting the cell stem of the queen cell cup containing the queen cell into a base of a queen rearing device having a queen emergence hole disposed there through and plugged with a plug;
    attaching a cage around the base and queen cell thereby protecting the queen cell;
    attaching a plurality of filled and attached bases and cages to a second slotted frame by inserting an attachment means on a side of the base opposite the cage into the second slotted frame;
    waiting for emergence of a queen from the queen cell;
    placing the live queen into a mating colony with the queen still enclosed in the base and attached cage;
    waiting for the live queen to be accepted by the mating colony; and
    removing the plug from the queen emergence hole thereby freeing the queen into the mating colony.

12. The method of rearing virgin queen bees of claim 11, further comprising the step of sliding the second slotted frame into an incubator prior to the step of waiting for emergence of a queen from the queen cell.

13. The method of rearing virgin queen bees of claim 11, wherein the plug is eatable by the queen bee or the mating colony bees.

14. The method of rearing virgin queen bees of claim 11, wherein the plug is not eatable.

* * * * *